(12) United States Patent
Vonog et al.

(10) Patent No.: US 8,549,167 B2
(45) Date of Patent: Oct. 1, 2013

(54) JUST-IN-TIME TRANSCODING OF APPLICATION CONTENT

(75) Inventors: Stanislav Vonog, San Francisco, CA (US); Nikolay Surin, San Francisco, CA (US); Tara Lemmey, San Francisco, CA (US)

(73) Assignee: Net Power and Light, Inc., San Francisco, CA (US)

( * ) Notice: Subject to any disclaimer, the term of this patent is extended or adjusted under 35 U.S.C. 154(b) by 267 days.

(21) Appl. No.: 13/165,710

(22) Filed: Jun. 21, 2011

(65) Prior Publication Data

US 2012/0331089 A1 Dec. 27, 2012

(51) Int. Cl.
*G06F 15/16* (2006.01)
(52) U.S. Cl.
USPC ............ 709/232; 709/231; 709/235; 709/246
(58) Field of Classification Search
USPC ................................................ 709/230, 246
See application file for complete search history.

(56) References Cited

U.S. PATENT DOCUMENTS

| | | | |
|---|---|---|---|
| 5,612,900 A * | 3/1997 | Azadegan et al. | ............ 709/247 |
| 2004/0078392 A1 | 4/2004 | Morita | |
| 2009/0119362 A1 | 5/2009 | Moriya | |
| 2010/0027562 A1 | 2/2010 | Carpio et al. | |
| 2011/0060792 A1 | 3/2011 | Ebersviller | |
| 2011/0107185 A1* | 5/2011 | Grube et al. | .................. 714/768 |
| 2012/0331089 A1* | 12/2012 | Vonog et al. | .................. 709/217 |

OTHER PUBLICATIONS

International Search Report mailed Dec. 12, 2012, of PCT Application No. PCT/US2012/043370, 3 pages.
Written Opinion mailed Dec. 12, 2012, of PCT Application No. PCT/US2012/043370, 5 pages.

* cited by examiner

*Primary Examiner* — Michael Won
(74) *Attorney, Agent, or Firm* — Perkins Coie LLP

(57) ABSTRACT

The techniques discussed herein contemplate improved methods and systems for transcoding application content to minimize latency in just-in-time conversion of application formats. In embodiments, a target client device requests application content of a particular format from a content provider. If the content provider does not have a local copy of the requested format, the content is split to multiple segments and a first high-priority segment is identified. This first segment is converted using a dedicated high-performance computing unit and transmitted with minimal latency to the target client device for immediate rendering. Concurrently, remaining segments of the content are converted in multiple lower performance computing units and fed into the target client device. By ensuring that at least a first segment of the application is available for immediate rendering while other segments are converted, the transcoding application minimizes latency delay in rendering of the application in the target device.

23 Claims, 20 Drawing Sheets

Tasks

| Name | Activator | Command | State | Slave | ID | Age | Active |
|---|---|---|---|---|---|---|---|
| Merger | xdLAQodf | Python Code | Running | powerslave | 308 | 00:00:10 | 00:00:10 |
| Encoder #0 | - | Python Code | Finished | - | - | 00:00:09 | 00:00:08 |
| Encoder #1 | xdLAQodf | Python Code | Running | i-b1e946da | 205 | 00:00:09 | 00:00:09 |
| Encoder #2 | xdLAQodf | Python Code | Running | i-b7e946dc | 204 | 00:00:09 | 00:00:09 |
| Encoder #3 | xdLAQodf | Python Code | Running | i-b7e946dc | 205 | 00:00:09 | 00:00:09 |
| Encoder #4 | xdLAQodf | Python Code | Running | i-b7e946dc | 206 | 00:00:09 | 00:00:09 |
| Encoder #5 | xdLAQodf | Python Code | Running | i-b7e946dc | 207 | 00:00:09 | 00:00:09 |
| Encoder #6 | - | Python Code | Finished | - | - | 00:00:09 | 00:00:09 |
| Encoder #7 | xdLAQodf | Python Code | Running | i-b1e946da | 206 | 00:00:09 | 00:00:09 |
| Encoder #8 | xdLAQodf | Python Code | Running | i-b1e946da | 207 | 00:00:09 | 00:00:09 |
| Encoder #9 | xdLAQodf | Python Code | Running | powerslave | 310 | 00:00:09 | 00:00:09 |
| Encoder #10 | xdLAQodf | Python Code | Running | powerslave | 311 | 00:00:09 | 00:00:09 |
| Encoder #11 | - | Python Code | Finished | - | - | 00:00:09 | 00:00:04 |

Activators

| Name | Connected |
|---|---|
| xdLAQodf | Yes |

Slaves

| Name | Ready | Load | Capacity |
|---|---|---|---|
| i-b1e946da | Yes | 3 | 4 |
| powerslave | Yes | 3 | 5 |
| i-b7e946dc | No | 4 | 4 |

*FIG. 19*

JUST-IN-TIME TRANSCODING OF APPLICATION CONTENT

FIELD

The present teaching relates to network communications and more specifically to improved methods and systems for transcoding application content "just-in-time."

BACKGROUND

With the ever-increasing integration of electronic devices in people's lives, users often use multiple types of electronic gadgets for use in everyday activities. For example, it is not uncommon for users to have a personal computer (e.g., a laptop) for work purposes, a smart phone (e.g., an iPhone®) for mobile connectivity, a set-top box connected to a digital television for home-entertainment purposes, etc. It is also not uncommon for such gadgets to render similar applications (e.g., streaming an online video clip). In typical instances, the user may have a number of these gadgets connected via a common network (e.g., a home wireless network). In such instances, the user may wish to switch rendering of an application from one mobile device to another for a variety of reasons.

Consider an illustrative scenario. A user, while walking from his car to his office is watching a video clip on his smart phone to prepare for a meeting. The video clip is streamed into his smart phone via the Internet from a remote server. As soon as the user enters his office, he may want to switch the video from the smart phone to his office computer to be able to view the video on a larger display screen. Typically, the format (e.g., the type of encoding) of the video streamed from the server to the device would depend on the type of device. For example, a video clip rendered to an iPhone device may need to be encoded according to H.264 standards. However, when the video rendering is switched from an iPhone to a laptop, the server may instead need to supply the video clip that is formatted according to, for example, Windows Media Video standards.

In typical scenarios, the server may not readily have a copy of the video file in the requested (i.e., the second) format. Accordingly, the server would have to encode or otherwise reformat the video data prior to streaming the video clip to the second client device, introducing substantial latency in the rendering of the video. Such data processing latency problems are only exacerbated when the application (e.g., the video clip) is converted on a remote server and streamed to the client device. In such cases, network latency and data processing latency both contribute to the inability of the client to deliver seamless rendering of the application.

Some prior art systems attempt to resolve this issue by retaining at least popularly requested content in several formats. This results in content providers having to increase their storage footprint to be able to handle storage of all the application content, increasing the cost of maintaining and delivering the content. Also, without knowing what type of application format will be required, the content providers would need to maintain a separate copy for every potential format of the application, further increasing the cost of storage. It would be preferable to deliver the content just-in-time, that is, when the data is requested by a client device. However, present systems suffer from the latency issues illustrated above when attempting to perform just-in-time transcoding.

SUMMARY

The techniques discussed herein contemplate a variety of improved methods and systems for transcoding application content to minimize latency of on-the-spur or just-in-time conversion of application formats. In embodiments, when a client device requests application content in a specified format, a content server delivering the application content determines whether the application content is available in a format suitable for the target client device. If not, the content server splits the application content to multiple segments and identifies a first segment for immediate (or high-priority) conversion to the target format. This first segment is transmitted to a high-performance computing unit that is dedicated for such initial high-priority segments. This segment is converted and transmitted with minimal latency to the target client device for immediate rendering. Concurrently, the remaining segments are converted in multiple lower performance computing units and fed into the target client device. In embodiments, a length of the first segment is chosen in a manner that ensures that there is sufficient content to be rendered in the target client device before the remaining segments trickle their way in from the remaining computing units. By ensuring that at least a first segment of the application is available for rendering while other segments are converted, the transcoding application avoids an initial latency delay of rendering of the application. This allows for seamless or near-seamless delivery of the application content and improved user experiences in situations where on-the-spur format conversion is necessary.

By using these techniques in preventing network or data processing latency from affecting seamless delivery of the application content, content providers are able to perform just-in-time transcoding, content providers may retain fewer or even just one copy (format) of application content, and convert the other content as necessary. Also, content providers may assess popularity of video content and have multiple copies (formats) of application content having a high demand, and retain minimal copies of application content found to have relatively lower demand. In embodiments, a combination of just-in-time transcoding and selective retention of multiple copies enables content providers to advantageously balance storage cost and latency in delivering application content in a networked environment.

In an illustrative embodiment, the just-in-time transcoding comes into play when a user utilizes an experience platform to switch rendering of the application content from one device type to another. In some instances, the user may cause such switching or transfer to happen using, for example, a physical or audio gesture that is captured and translated by the experience platform. In embodiments, when the switching occurs to a target client device.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

FIG. 19 shows an exemplary listing of statistics corresponding to the distributed computing units of a transcoding service.

DETAILED DESCRIPTION OF THE INVENTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
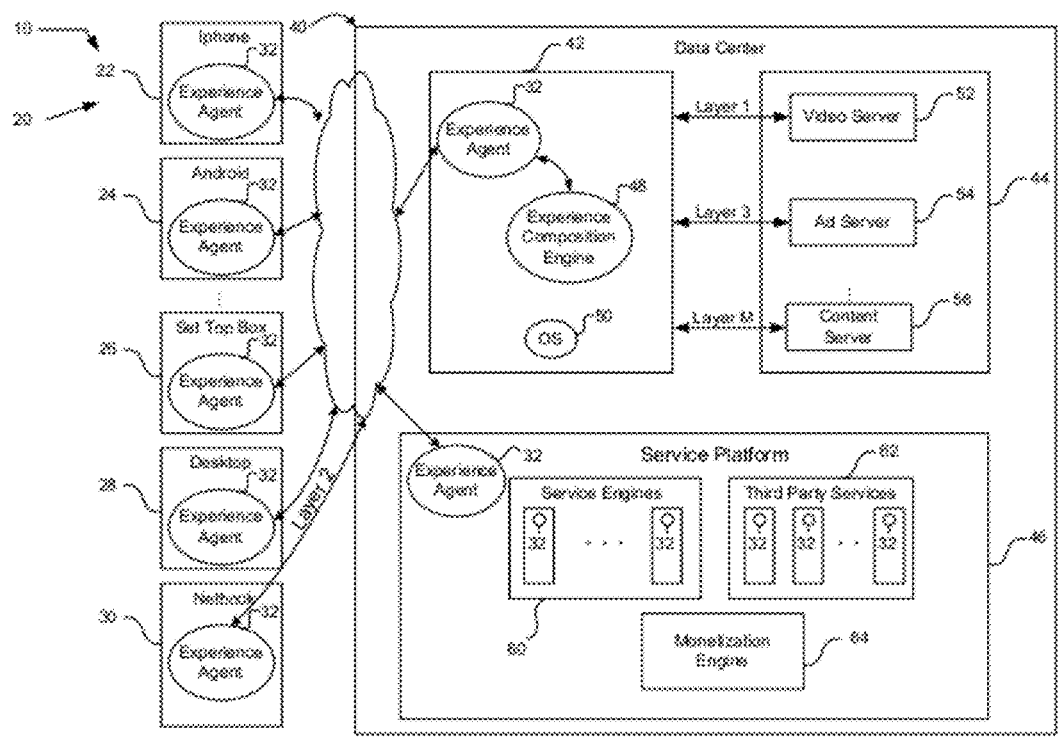
FIG. 1 illustrates a system architecture for composing and directing user experiences.

FIG. 1 illustrates an exemplary embodiment of a system 10 that may be used for practicing the techniques discussed herein. The system 10 can be viewed as an "experience platform" or system architecture for composing and directing a participant experience. In one embodiment, the experience platform 10 is provided by a service provider to enable an experience provider to compose and direct a participant experience. The participant experience can involve one or more experience participants. The experience provider can create an experience with a variety of dimensions, as will be explained further now. As will be appreciated, the following description provides one paradigm for understanding the multi-dimensional experience available to the participants. There are many suitable ways of describing, characterizing and implementing the experience platform contemplated herein.

In general, services are defined at an API layer of the experience platform. The services are categorized into "dimensions." The dimension(s) can be recombined into "layers." The layers form to make features in the experience.

By way of example, the following are some of the dimensions that can be supported on the experience platform.

Video—is the near or substantially real-time streaming of the video portion of a video or film with near real-time display and interaction.

Audio—is the near or substantially real-time streaming of the audio portion of a video, film, karaoke track, song, with near real-time sound and interaction.

Live—is the live display and/or access to a live video, film, or audio stream in near real-time that can be controlled by another experience dimension. A live display is not limited to single data stream.

Encore—is the replaying of a live video, film or audio content. This replaying can be the raw version as it was originally experienced, or some type of augmented version that has been edited, remixed, etc.

Graphics—is a display that contains graphic elements such as text, illustration, photos, freehand geometry and the attributes (size, color, location) associated with these elements. Graphics can be created and controlled using the experience input/output command dimension(s) (see below).

Input/Output Command(s)—are the ability to control the video, audio, picture, display, sound or interactions with human or device-based controls. Some examples of input/output commands include physical gestures or movements, voice/sound recognition, and keyboard or smart-phone device input(s).

Interaction—is how devices and participants interchange and respond with each other and with the content (user experience, video, graphics, audio, images, etc.) displayed in an experience. Interaction can include the defined behavior of an artifact or system and the responses provided to the user and/or player.

Game Mechanics—are rule-based system(s) that facilitate and encourage players to explore the properties of an experience space and other participants through the use of feedback mechanisms. Some services on the experience Platform that could support the game mechanics dimensions include leader boards, polling, like/dislike, featured players, star-ratings, bidding, rewarding, role-playing, problem-solving, etc.

Ensemble—is the interaction of several separate but often related parts of video, song, picture, story line, players, etc. that when woven together create a more engaging and immersive experience than if experienced in isolation.

Auto Tune—is the near real-time correction of pitch in vocal and/or instrumental performances. Auto Tune is used to disguise off-key inaccuracies and mistakes, and allows singer/players to hear back perfectly tuned vocal tracks without the need of singing in tune.

Auto Filter—is the near real-time augmentation of vocal and/or instrumental performances. Types of augmentation could include speeding up or slowing down the playback, increasing/decreasing the volume or pitch, or applying a celebrity-style filter to an audio track (like a Lady Gaga or Heavy-Metal filter).

Remix—is the near real-time creation of an alternative version of a song, track, video, image, etc. made from an original version or multiple original versions of songs, tracks, videos, images, etc.

Viewing 360°/Panning—is the near real-time viewing of the 360° horizontal movement of a streaming video feed on a fixed axis. Also the ability to for the player(s) to control and/or display alternative video or camera feeds from any point designated on this fixed axis.

Turning back to FIG. 1, the experience platform 10 includes a plurality of devices 20 and a data center 40. The devices 12 may include devices such as an iPhone 22, an android 24, a set top box 26, a desktop computer 28, a netbook 30, or other such computing devices. At least some of the devices 12 may be located in proximity with each other and coupled via a wireless network. In certain embodiments, a participant utilizes multiple devices 12 to enjoy a heterogeneous experience, such as using the iPhone 22 to control operation of the other devices. Participants may, for example, view a video feed in one device (e.g., an iPhone) and switch the feed to another device (e.g., a netbook) to switch the feed to a larger display device. In other examples, multiple participants may also share devices at one location, or the devices may be distributed across various locations for different participants.

Each device 12 has an experience agent 32. The experience agent 32 includes a sentio codec and an API. The sentio codec and the API enable the experience agent 32 to communicate with and request services of the components of the data center 40. The experience agent 32 facilitates direct interaction between other local devices. Because of the multi-dimensional aspect of the experience, the sentio codec and API are required to fully enable the desired experience. However, the functionality of the experience agent 32 is typically tailored to the needs and capabilities of the specific device 12 on which the experience agent 32 is instantiated. In some embodiments, services implementing experience dimensions are implemented in a distributed manner across the devices 12 and the data center 40. In other embodiments, the devices 12 have a very thin experience agent 32 with little functionality beyond a minimum API and sentio codec, and the bulk of the services and thus composition and direction of the experience are implemented within the data center 40.

Data center 40 includes an experience server 42, a plurality of content servers 44, and a service platform 46. As will be appreciated, data center 40 can be hosted in a distributed manner in the "cloud," and typically the elements of the data center 40 are coupled via a low latency network. The experience server 42, servers 44, and service platform 46 can be implemented on a single computer system, or more likely distributed across a variety of computer systems, and at various locations.

The experience server 42 includes at least one experience agent 32, an experience composition engine 48, and an operating system 50. In one embodiment, the experience composition engine 48 is defined and controlled by the experience provider to compose and direct the experience for one or more participants utilizing devices 12. Direction and composition is accomplished, in part, by merging various content layers and other elements into dimensions generated from a variety of sources such as the service provider 42, the devices 12, the content servers 44, and/or the service platform 46.

The content servers 44 may include a video server 52, an ad server 54, and a generic content server 56. Any content suitable for encoding by an experience agent can be included as an experience layer. These include well know forms such as video, audio, graphics, and text. As described in more detail earlier and below, other forms of content such as gestures, emotions, temperature, proximity, etc., are contemplated for encoding and inclusion in the experience via a sentio codec, and are suitable for creating dimensions and features of the experience.

The service platform 46 includes at least one experience agent 32, a plurality of service engines 60, third party service engines 62, and a monetization engine 64. In some embodiments, each service engine 60 or 62 has a unique, corresponding experience agent. In other embodiments, a single experience 32 can support multiple service engines 60 or 62. The service engines and the monetization engines 64 can be instantiated on one server, or can be distributed across multiple servers. The service engines 60 correspond to engines generated by the service provider and can provide services such as audio remixing, gesture recognition, and other services referred to in the context of dimensions above, etc. Third party service engines 62 are services included in the service platform 46 by other parties. The service platform 46 may have the third-party service engines instantiated directly therein, or within the service platform 46 these may correspond to proxies which in turn make calls to servers under control of the third-parties.

Monetization of the service platform 46 can be accomplished in a variety of manners. For example, the monetization engine 64 may determine how and when to charge the experience provider for use of the services, as well as tracking for payment to third-parties for use of services from the third-party service engines 62.

Figure 2:
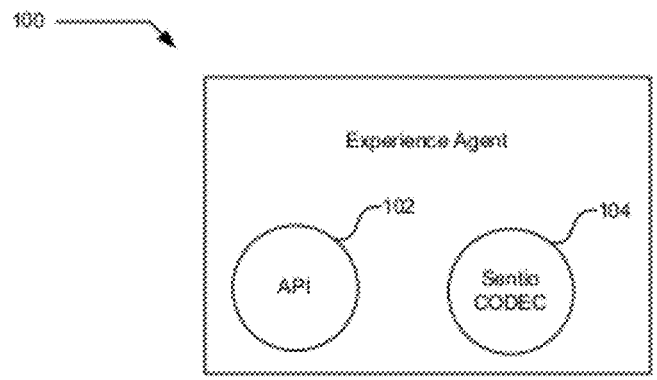
FIG. 2 is a block diagram of an experience agent.

FIG. 2 illustrates a block diagram of an experience agent 100. The experience agent 100 includes an application programming interface (API) 102 and a sentio codec 104. The API 102 is an interface which defines available services, and enables the different agents to communicate with one another and request services.

The sentio codec 104 is a combination of hardware and/or software which enables encoding of many types of data streams for operations such as transmission and storage, and decoding for operations such as playback and editing. These data streams can include standard data such as video and audio. Additionally, the data can include graphics, sensor data, gesture data, and emotion data. ("Sentio" is Latin roughly corresponding to perception or to perceive with one's senses, hence the nomenclature "sensio codec.")

Figure 3:
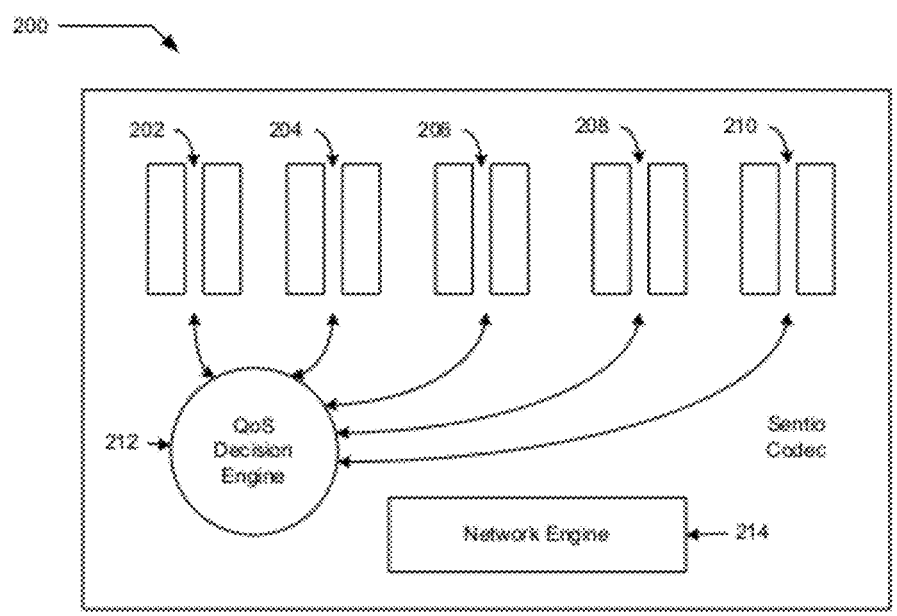
FIG. 3 is a block diagram of a sentio codec.

FIG. 3 illustrates a block diagram of a sentio codec 200. The sentio codec 200 includes a plurality of codecs such as video codecs 202, audio codecs 204, graphic language codecs 206, sensor data codecs 208, and emotion codecs 210. The sentio codec 200 further includes a quality of service (QoS) decision engine 212 and a network engine 214. The codecs, the QoS decision engine 212, and the network engine 214 work together to encode one or more data streams and transmit the encoded data according to a low-latency transfer protocol supporting the various encoded data types. One example of this low-latency protocol is described in more detail in Vonog et al.'s U.S. patent application Ser. No. 12/569,876, filed Sep. 29, 2009, and incorporated herein by reference for all purposes including the low-latency protocol and related features such as the network engine and network stack arrangement.

The sentio codec 200 can be designed to take all aspects of the experience platform into consideration when executing the transfer protocol. The parameters and aspects include available network bandwidth, transmission device characteristics and receiving device characteristics. Additionally, the sentio codec 200 can be implemented to be responsive to commands from an experience composition engine or other outside entity to determine how to prioritize data for transmission. In many applications, because of human response, audio is the most important component of an experience data stream. However, a specific application may desire to emphasize video or gesture commands.

The sentio codec provides the capability of encoding data streams corresponding with many different senses or dimensions of an experience. For example, a device 12 may include a video camera capturing video images and audio from a participant. The user image and audio data may be encoded and transmitted directly or, perhaps after some intermediate processing, via the experience composition engine 48, to the service platform 46 where one or a combination of the service engines can analyze the data stream to make a determination about an emotion of the participant. This emotion can then be encoded by the sentio codec and transmitted to the experience composition engine 48, which in turn can incorporate this into a dimension of the experience. Similarly a participant gesture can be captured as a data stream, e.g. by a motion sensor or a camera on device 12, and then transmitted to the service platform 46, where the gesture can be interpreted, and transmitted to the experience composition engine 48 or directly back to one or more devices 12 for incorporation into a dimension of the experience.

Figure 4:
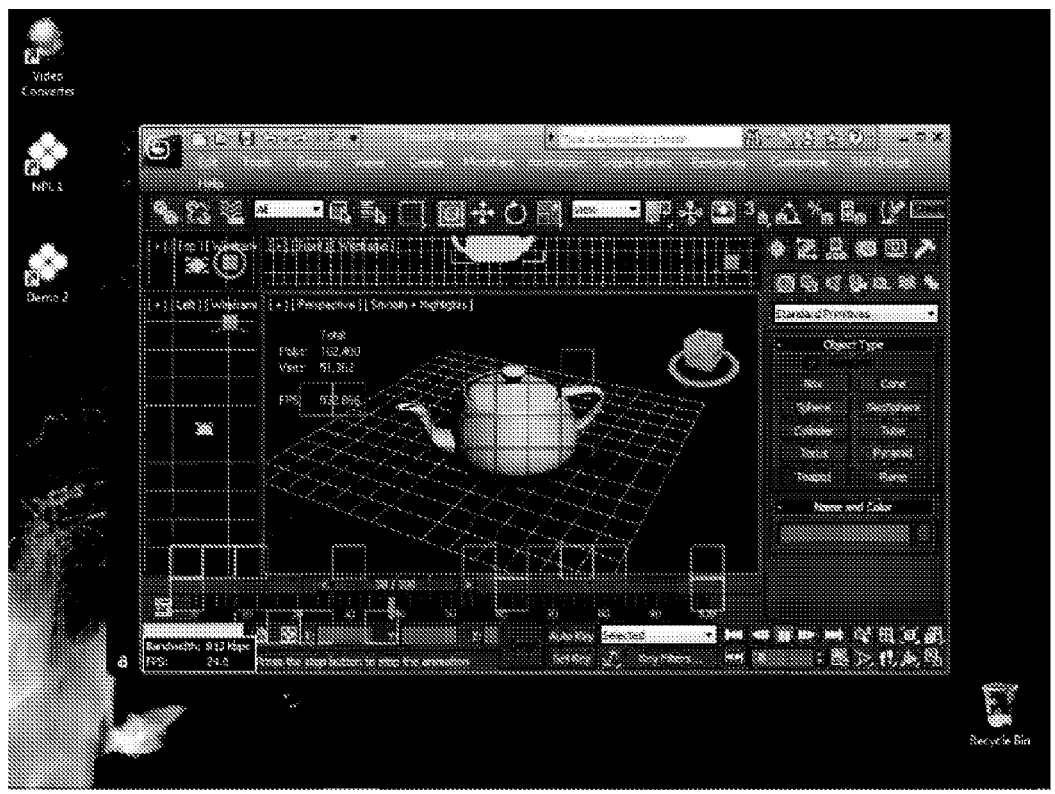
FIGS. 4-16 illustrate several example experiences involving the merger of various layers including served video, video chat, PowerPoint, and other services.
Figure 5:
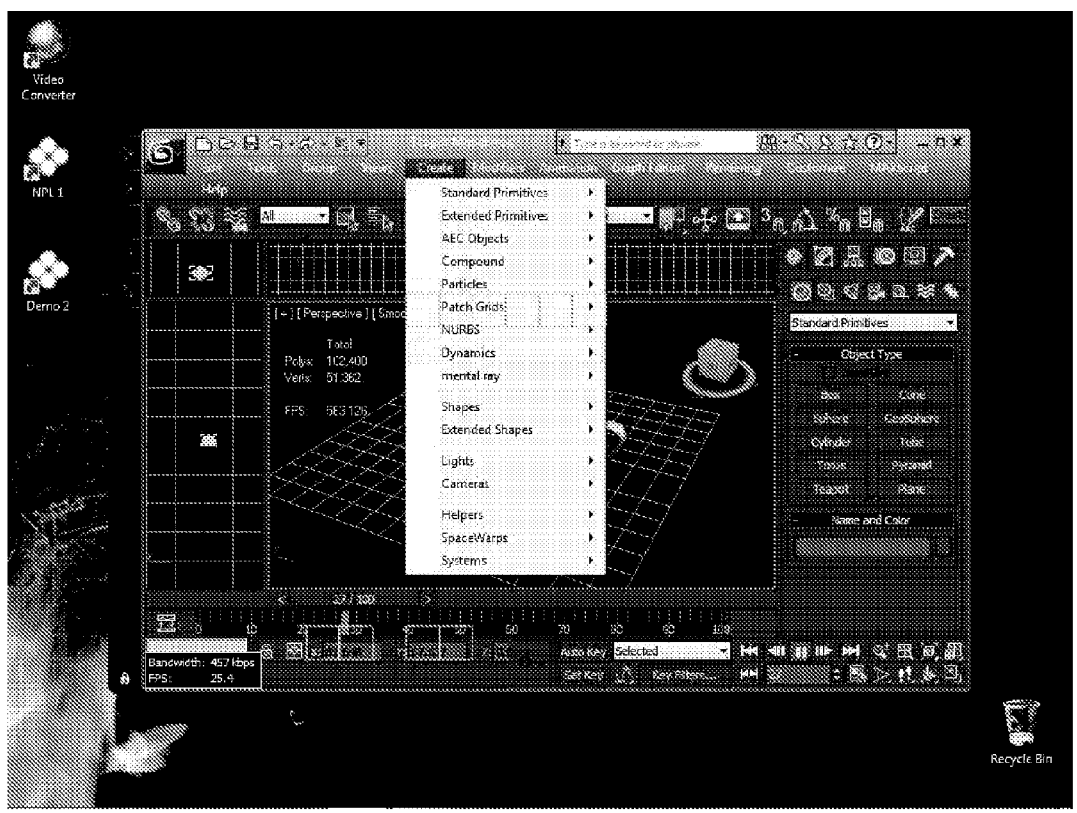

FIGS. 4-5 provide an example experience showing 4 layers. These layers are distributed across various different devices. For example, a first layer is Autodesk 3ds Max instantiated on a suitable layer source, such as on an experience server or a content server. A second layer is an interactive frame around the 3ds Max layer, and in this example is generated on a client device by an experience agent. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the 3ds Max layer on the experience server.

Figure 6:
Figure 7:
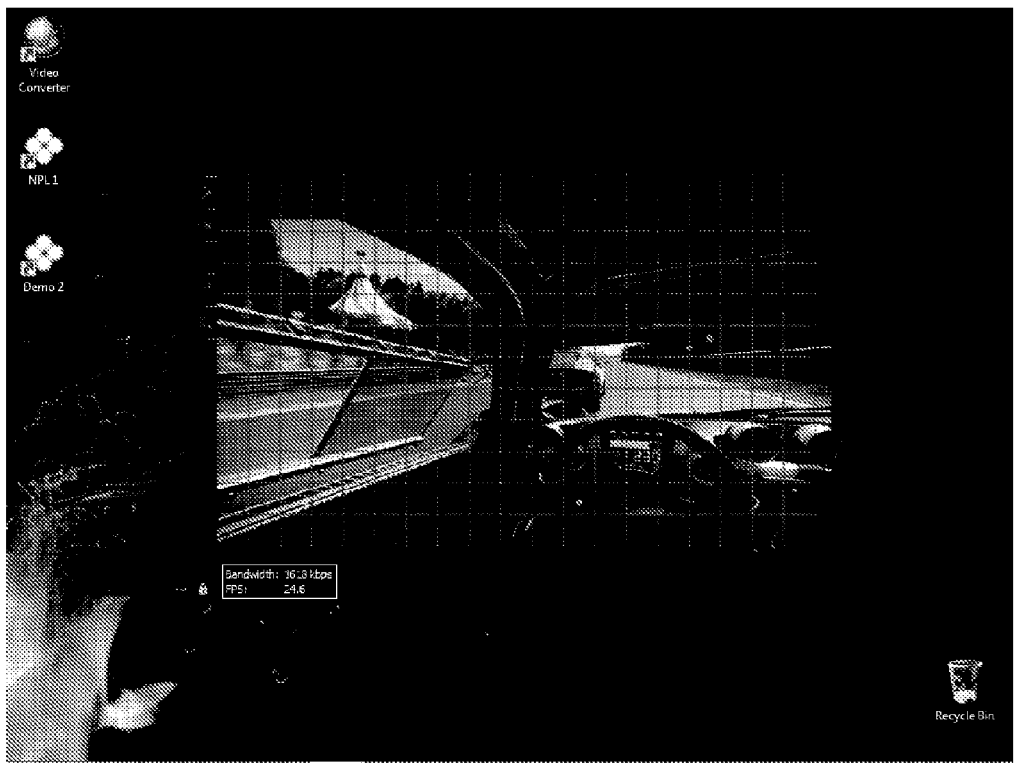

FIGS. 6-7, similar to FIGS. 4-5, show four layers, but in this case instead of a 3ds Max base layer, a first layer is generated by piece of code developed by EA and called "Need for Speed." A second layer is an interactive frame around the Need for Speed layer, and may be generated on a client device by an experience agent, on the service platform, or on the experience platform. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the Need for Speed layer on the experience server.

Figure 8:
Figure 9:
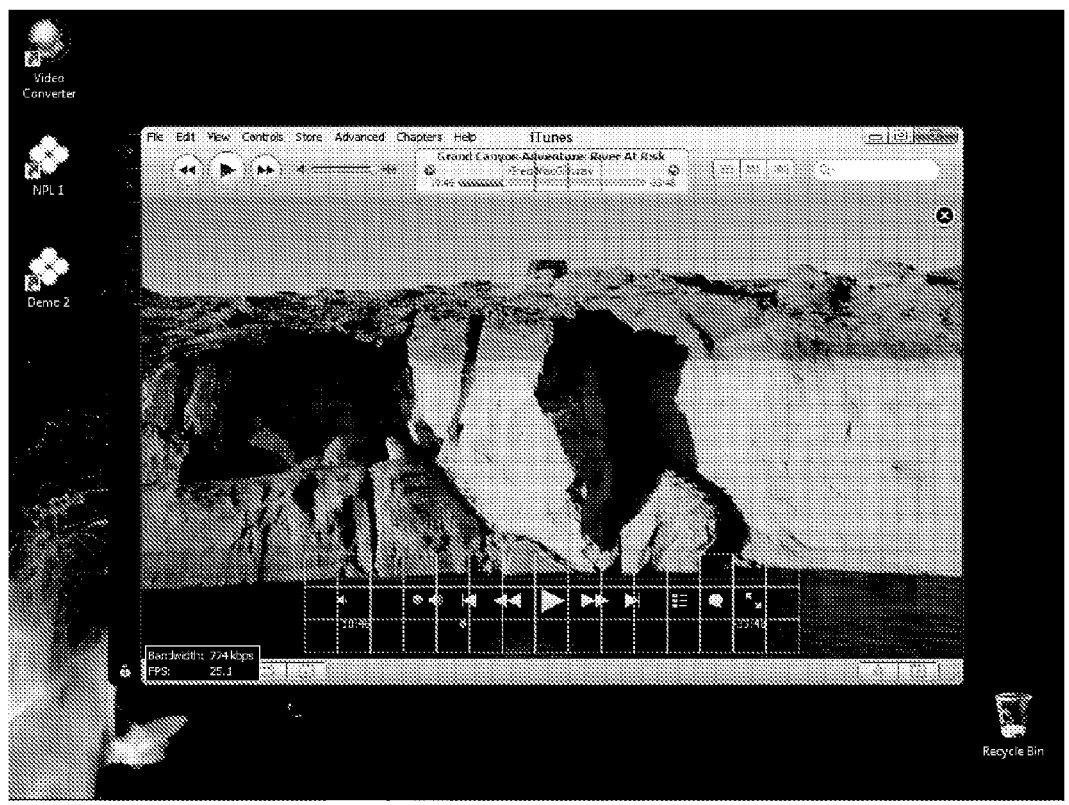
Figure 10:
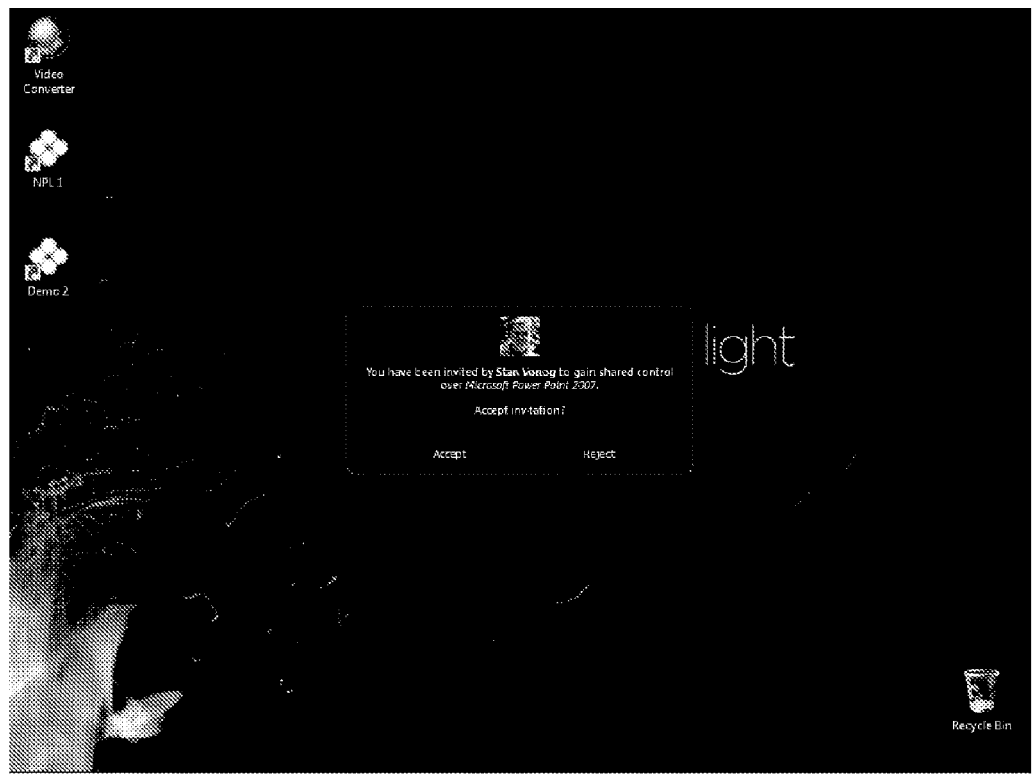
Figure 11:
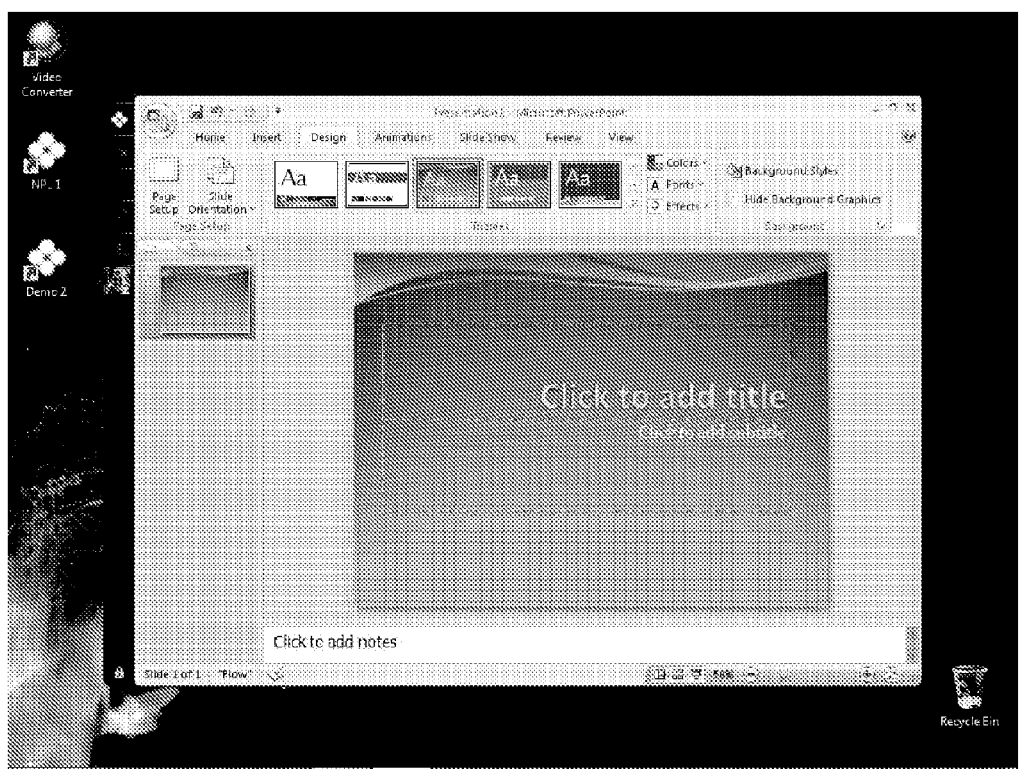

FIGS. 8-9 illustrate a base layer being a movie with DRM protection provided by iTunes/Apple iTunes store, the base layer here being provided by a video server, and merged on the experience platform.

Figure 12:
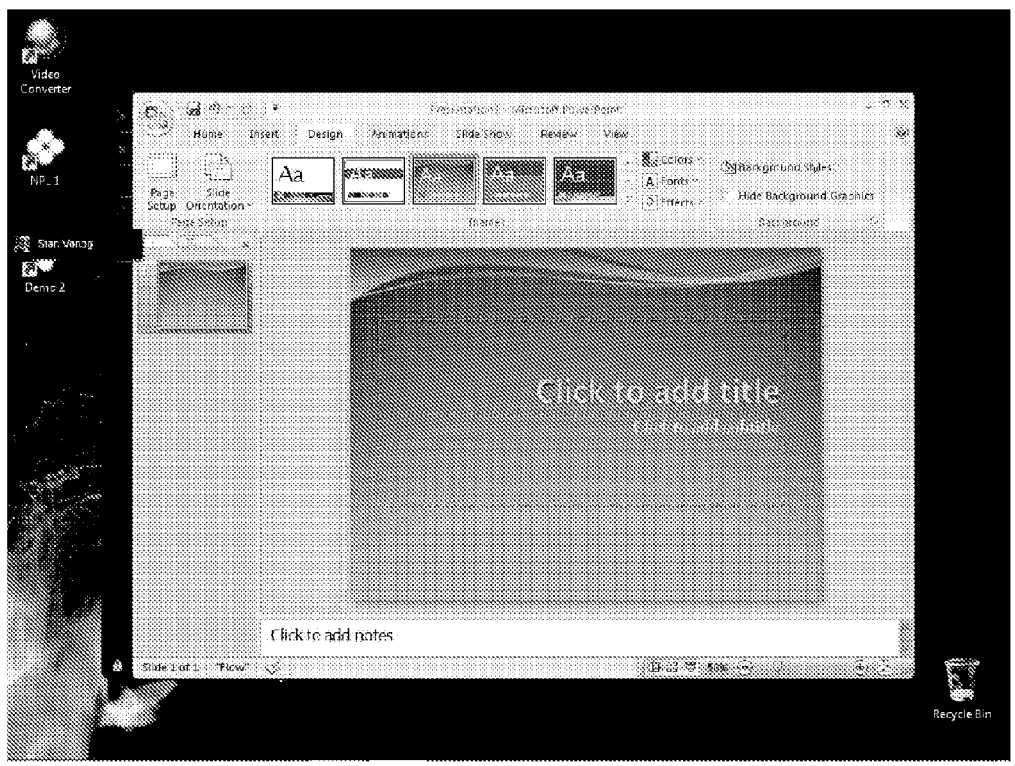
Figure 13:
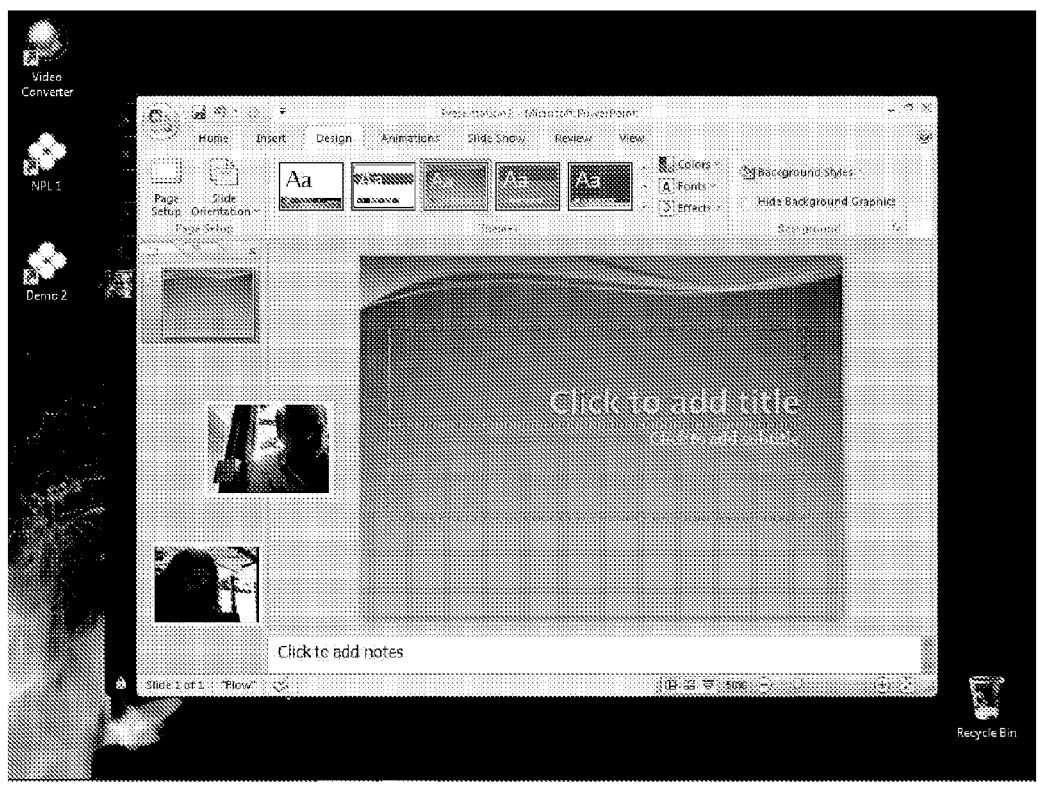
Figure 14:
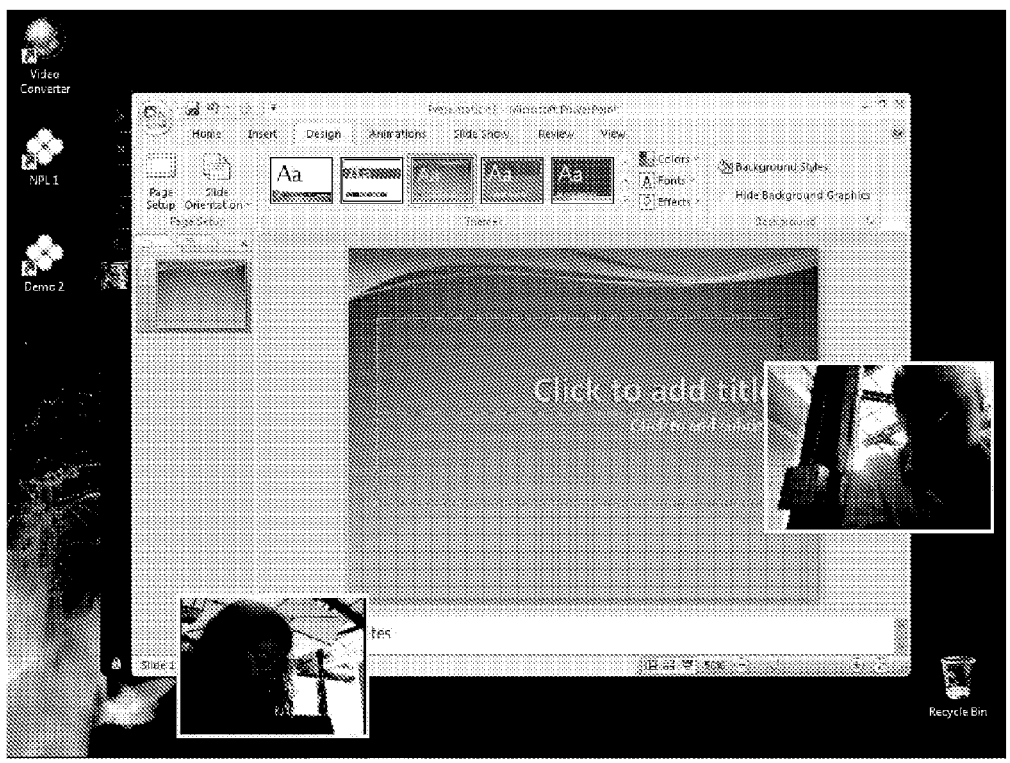
Figure 15:
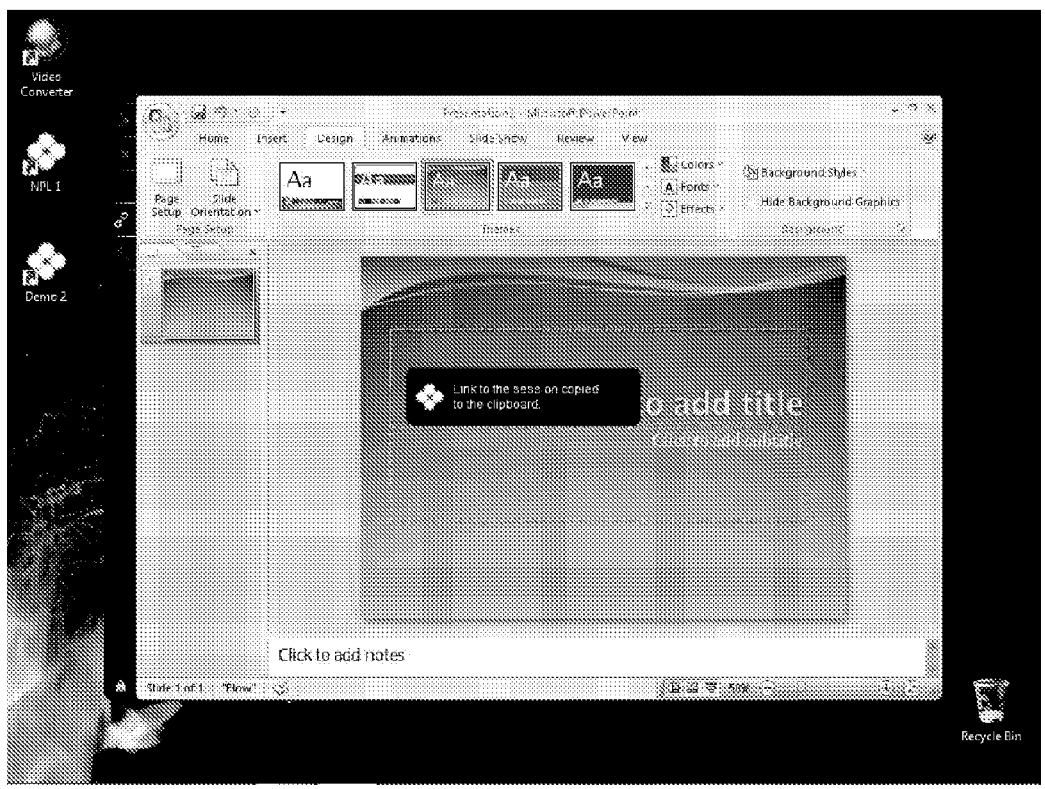
Figure 16:
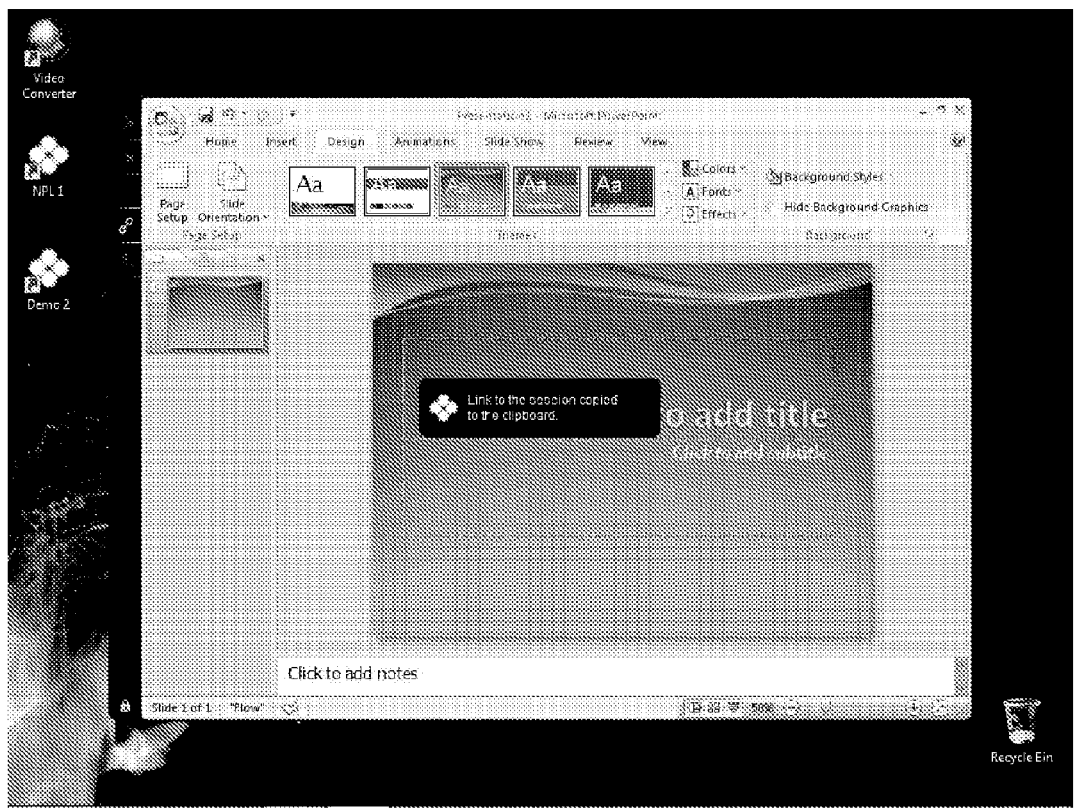

FIGS. 10-16 demonstrate several dimensions available with a base layer generated by piece of code called Microsoft PowerPoint. For example, FIGS. 10-11 and 15-16 illustrate how an interactive frame layer can be merged with the PowerPoint layer. Further, FIGS. 12-14 illustrate how video chat layer(s) can be merged with the PowerPoint layer. The interactive frame layer and the video chat layer can be rendered on specific client devices, or on the experience server The description above illustrated in some detail how a specific application, an "experience," can operate and how such an application can be generated as a composite of layers. FIGS. 15-19, explained below in detail, now illustrate a transcoding service that is utilized when content endemic to an application or an experience (e.g., a video layer) is switched from a first client device to a second client device. In embodiments, the transcoding application comes into play when the first client device and second client device render the same content in two different formats, and consequently, the data center (or any other content provider) needs to provide content in a different format when the experience is switched to the second client device. Implementation of the transcoding service can be built over a virtual cloud, for example, on top of Amazon Web Services. In particular, the virtual cloud illustrates distributing the transcoding service over a plurality of virtual machines instantiated by the third-party service.

Consider an illustrative scenario where the experience relates to playback of video content (i.e., application content) on a user's iPhone® device. A content server provides the video content, for example, as streaming media. The content server, having a cached copy of the requested video content, provides the content (in a format compatible with the iPhone® device) from, for example, a local cache. However, as part of the user experience paradigm contemplated by the techniques discussed herein, the user may wish to switch playback of the video content from the iPhone device to a laptop or another computing device, to perhaps be able to watch the video content on a larger screen. The user may initiate such a transfer using a physical or audio gesture, as may be contemplated by the user experiences discussed herein. For example, in embodiments, the user may transfer the video content from the iPhone to the laptop by a simple sway of the iPhone in a direction pointing to the laptop. This would enable the video to, for example, simply cease (or just pause) playing on the iPhone and start playing on the laptop from the point at which the video stopped playing on the iPhone. Of course, it is contemplated that the two client devices have corresponding experience agents (similar to the ones discussed with respect to FIGS. 1-2) to be able to capture and react to such gestures.

Figure 18:
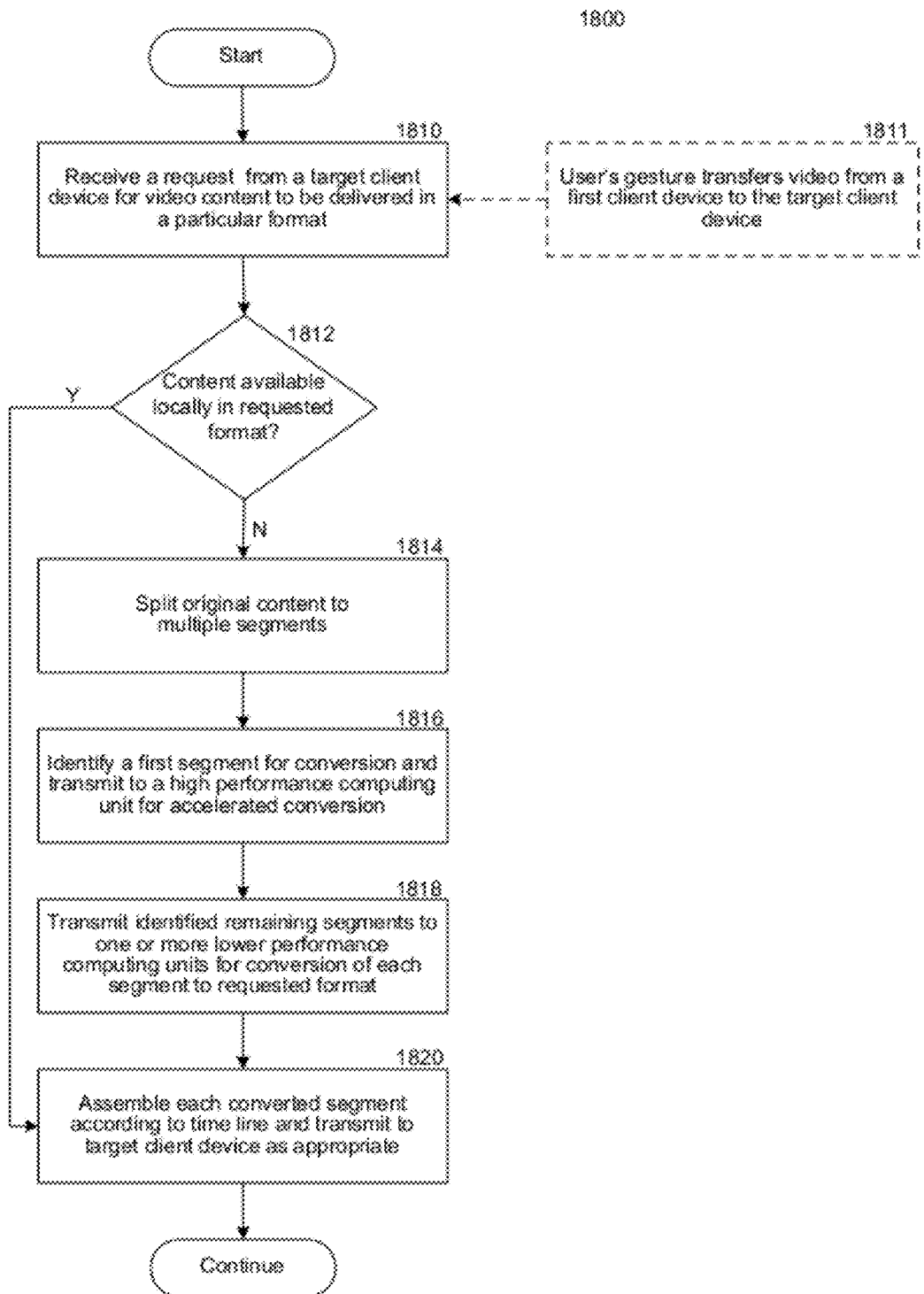
FIG. 18 presents a flow diagram illustrating an exemplary process for performing a transcoding process

It is understood that the transcoding services discussed herein may also be practiced independent of the above experience paradigms. For example, the transcoding techniques explained below may be implemented when a content server receives a request for content in a format different from a locally cached format of the content (without any involvement of user experiences). Also, while the following description illustrates the transcoding service with respect to video content, it is understood that the general transcoding principles may similarly be applied to any application content that is, for example, supported on the experience platform. FIGS. 18-19 now discuss these transcoding techniques in detail.

Figure 17:
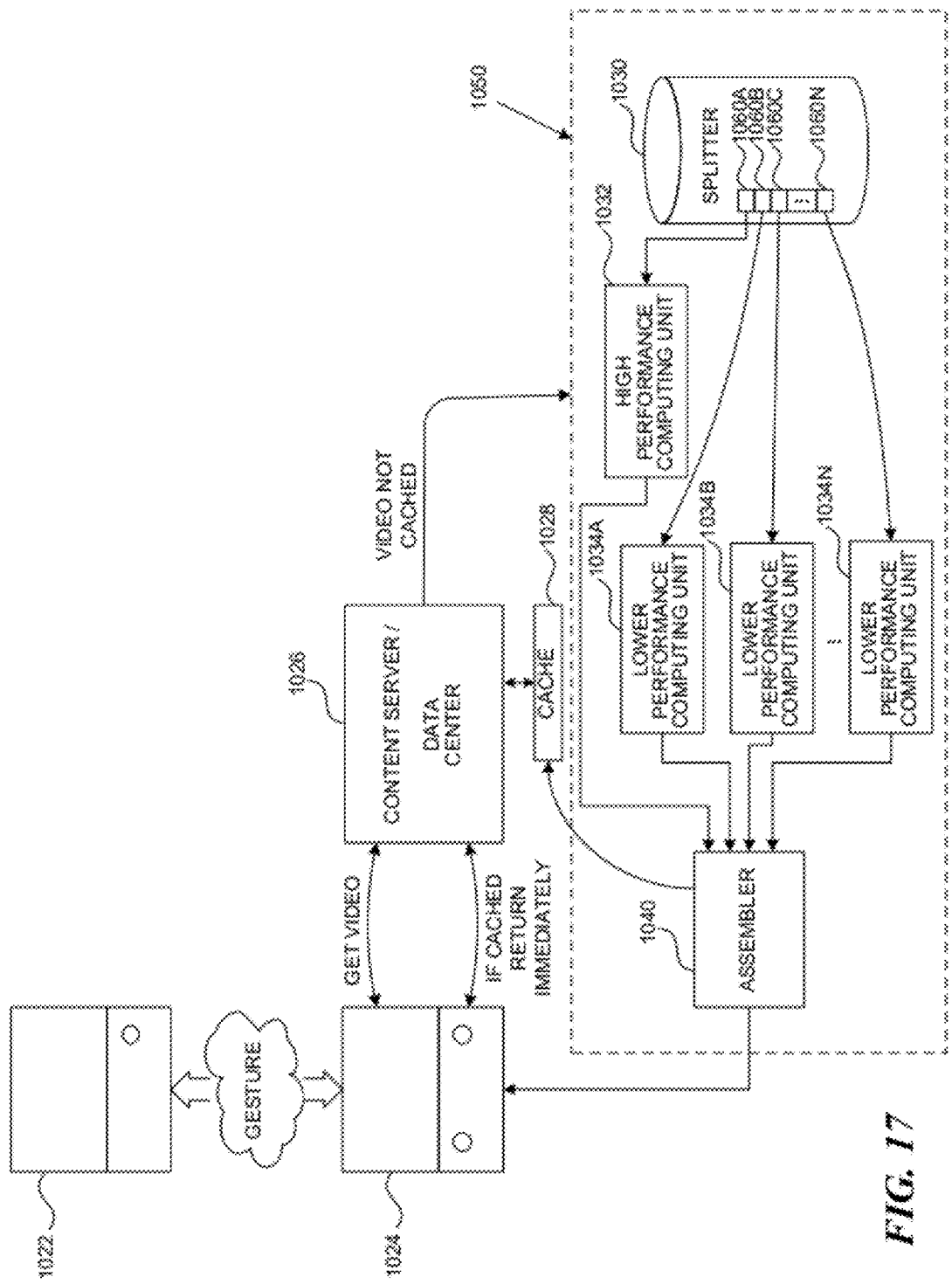
FIG. 17 illustrates a block diagram of a system 1700 illustrating transcoding operations.

FIG. 17 illustrates a block diagram of a system 1700 illustrating transcoding operations. Device 1022 is a first client device integrated with an experience agent. By way of illustration, device 1022 is an iPhone® device. Device 1024 is a second client device, also integrated with the experience agent. In this example, device 1022 is a laptop computer. Consider the exemplary scenario where a user is watching a video clip delivered (e.g., streamed in) from a content server 1026 using device 1022. In this example, the content server 1026 contains the requested video clip in a format compatible with the iPhone and accordingly streams the content out to device 1022. When, for example, the user switches playback of the video clip from device 1022 to device 1024 (by means of, for example, a physical gesture to indicate an intent to transfer playback), the content server 1026 receives a request to stream out the video content to device 1024 in a format that is compatible with device 1024. Of course, no switching needs is necessary for the techniques discussed herein to be activated. A simple request from a client device for application content of a particular format is sufficient to trigger the just-in-time transcoding services discussed herein.

As contemplated here, the content server first verifies whether the requested format (e.g., the second format of the video clip) is locally available, for example, in cache 1028. If the second format is available, the content server simply continues to stream the content out in the second content. However, if the second content is not available in cache, the content server needs to convert (or initiate conversion using third party services) the video clip from the first format to the second format. In embodiments, the content server may initiate conversion of the video clip only from the point at which the video was transferred to device 1024 or may simply initiate conversion for the entire video clip.

In embodiments, as discussed above, the content server initiates a conversion process in a distributed processing setup over a cloud (e.g., using third party or proprietary cloud services). As illustrated in FIG. 17, block 1050 indicates this distributed processing. A splitter 1030 receives the video clip (either the entire clip, or a remaining portion of the clip that needs to be converted) and splits the clip into several segments. The number of segments may be defined based on a performance capability of the high performance 1032 and lower performance computing units 1034 indicated in block 1050. For example, if the high performance computing unit 1032 can handle 30 seconds worth of video feed for near-instant conversion to the second format, then the video clip is split to generate a first segment of 30 seconds and then converts the remaining video clip into segments for being fed into the lower performance computing units 1034. In embodiments, the number of segments for the lower performance computing units may be determined by the number of freely available lower performance computing unit available for conversion of the remaining video clip. In embodiments, the high performance computing unit 1032 and/or the lower performance computing units 1034 are dedicated for the sole purpose of conversion of content to a specified format. Accordingly, they are maintained free (i.e., not utilized for any other computing operation), such that they are immediately available for the transcoding process when a request is received at the content server 1026.

Furthermore, even when multiple conversion requests may be imposed on the distributed block 1050 (i.e., multiple requests are simultaneously received from several different client devices for a variety of video clips in different formats), it can be appreciated that the high performance computing unit 1032 is kept free for receiving requests and working on them instantly (or near instantly) by ensuring that only a small load is applied to it for immediate conversion. In embodiments, it can be contemplated that the distributed block includes multiple high performance computing units commensurate with the number of conversion requests likely to be received. Also, in the multiple request scenario, the splitter 1030 implements algorithms to split (and distribute) the various video clips optimally to ensure that at least a certain number of segments of each video clip is available for being streamed into device 1024, with minimal or no latency.

As defined herein, a high performance computing unit 1032 is, for example, a processor architecture or cloud computing architecture with high processing capability. By virtue of such computing units being prohibitively expensive, the transcoding principles described herein make use of one or a small set of such higher performance computing units to get an initial spurt of video content converted to the second format (i.e., format compatible with device 1024). This way, at least an initial video feed, corresponding to the content converted using the higher performance computing unit(s) is available for minimal-latency playback at device 1024 while the rest of the clip is converted using a distributed architecture. In embodiments, while the initial segment is being converted and sent for playback to device 1024, the remaining segments are converted using the lower performance computing units that are more affordable (relative to the high performance computing unit). The assembler 1040 combines the converted segments received from the various computing units. Further, in embodiments, the assembler 1040 organizes the converted segments in timeline order and transmits segments as appropriate for playback to device 1024. In embodiments, assembler 1040 may receive all converted segments and assemble them in a timeline prior to transmitting to device 1024. In other embodiments, the assembler may simply transmit the segments to the client device as and when the segments are received. In examples, the assembled content may also be fed back to cache 1028 to ensure that the content server 1026 has a cached copy of the video content in the new format for subsequent requests.

It is understood that the splitter 1030 and assembler 1040 operations indicated in block 1050 may be performed in the content server 1026 itself or in another such computing device (instead of such blocks being part of a cloud). Similarly, the computing units illustrated as cloud computing units in block 1050 may instead be substituted with an array of processors or other such distributed computing resources directly within (or in conjunction with) the content server 1026. It is further understood that the content server 1026 may simply be the data center as described in FIG. 1 or can also be computing devices that control transmission of online video content to client devices.

In embodiments, application content providers may utilize a combination of maintaining cached versions of popular formats and just-in-time transcoding techniques to optimize the cost of transcoding. For example, application providers may retain popular application content (e.g., video clips from a popular movie heavily demanded for instant viewing) in several formats, while retaining the less popular application content in just one format. In examples, application providers may retain content in multiple popularly requested formats, but not retain any copies of the less-frequently requested formats. In examples, content providers may utilize combinations of such techniques to perform the transcoding techniques, effectively reducing storage cost while improving latency in delivery of content.

FIG. 18 now presents a flow diagram illustrating an exemplary process 1800 for performing a transcoding process. In embodiments, the process 1800 is implemented in conjunction with the system 1700 explained above in reference with FIG. 17. At step 1810, the process receives a request from a target client device for video content to be delivered in a particular format. As indicated above, such a request could arise, for example, when a client utilizes a physical gesture to transfer video playback from a first client device to the target client device, as indicated at optional step 1811. At step 1812, the process 1800 verifies whether the video content is locally available (e.g., in cache) in the requested format. If the content in the requested format is available, the process 1800 simply transfers to step 1820, where the content is transmitted to the target client device. If, however, the content is not locally available, process 1800 shifts to step 1814, where the content is split into multiple segments (as described in detail, for example, with reference to FIG. 17). A first segment is fed to a high performance computing device as indicated at step 1816 for immediate conversion to the requested format, while the other segments are fed to an array of lower performance computing devices as indicated at step 1818. The converted segments are then assembled at step 1820 and transmitted to the target client device as appropriate.

FIG. 19 shows an exemplary listing of statistics corresponding to the distributed computing units of a transcoding service. As illustrated, encoder #0 is an example of a high performance computing device that receives a first segment of video content that needs to be converted. The remaining encoders are lower performance computing devices that receive various remaining segments of the content for conversion. A merger is configured to continuously monitor the various computing units, receive converted segments, and assemble the converted segments in timeline order.

Figure 20:
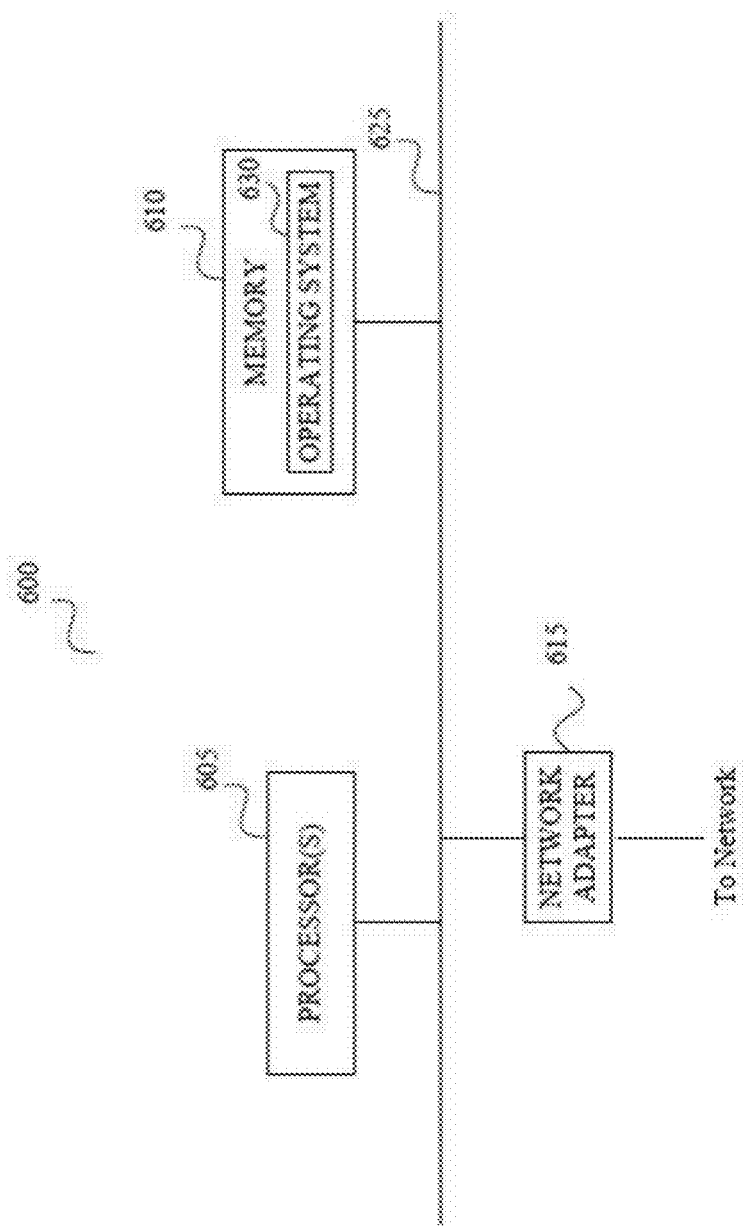
FIG. 20 is a high-level block diagram showing an example of the architecture for a computer system that can be utilized to implement the techniques discussed herein.

FIG. 20 is a high-level block diagram showing an example of the architecture for a computer system 600 that can be utilized to implement a data center (e.g., 40 from FIG. 1), a content server (e.g., 1026 from FIG. 17), etc. In FIG. 20, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 1100. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention.

Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

The invention claimed is:

1. A computer implemented method of delivering media content to a client device, the method comprising:
   receiving, by a content server, a request from the client device for media content to be delivered to the client device at a specific format that is compatible with the client device;
   if the media content is locally available in the specified format, delivering, by the content server, the locally available media content to the client device; and
   if the media content is not locally available in the specified format:
      splitting the media content into a plurality of segments, the plurality of segments including a high-priority segment and a plurality of low-priority segments, wherein a segment-length of the high-priority segment is selected as a function of performance indicators associated with the plurality of lower-performance computing entities and wherein at the time of splitting the media content into a plurality of segments, dynamically adjusting segment-length of the high-priority segment based on the performance indicators;

transmitting the high-priority segment to a selected high-performance computing entity for prioritized conversion of the high-priority segment to the specific format;

transmitting the converted high-priority segment to the client device for playback of the media content pertaining to the high-priority segment;

transmitting each of the plurality of low-priority segments to one of a plurality of lower-performance computing entities for conversion of each of the low-priority segments to the specified format; and serially transmitting the converted low-priority segments to the client device for to be played back subsequent to the playback of the high-priority segment.

2. A computer implemented method as recited in claim 1, wherein said receiving a request from the client device further includes:

identifying a specific user action transferring playback of the media content from a transferee device to said client device, the transferee device configured to playback the media content using a first format and said client device configured to playback the media content using the specific format.

3. A computer implemented method as recited in claim 2, wherein the specific user action is a physical gesture of the user in relation to the transferee device or the client device.

4. A computer implemented method as recited in claim 2, wherein, at the time of receiving the request from the client device, the content server includes a local copy of the media content in the first format.

5. A computer implemented method as recited in claim 1, wherein the high-performance computing entity and each of the plurality of lower-performance computing entities are realized as one or more computing blocks in a cloud computing environment.

6. A computer implemented method as recited in claim 1, prior to transmitting the converted high-priority segment and the converted low-priority segments to the client device, the method further includes:

receiving converted versions of the high-priority segment and/or the low-priority segments at an assembler; and coordinating, by the assembler, delivery of the converted versions of the segments in a linear time order to the client device.

7. A computer implemented method as recited in claim 1, wherein the media content is video content.

8. A computer implemented method as recited in claim 1, further comprising:

linearly assembling converted versions of the high-priority segment and the plurality of low-power segments, the linearly assembled content being the media content in the specific format; and locally storing the media content in the specific format in association with the content server.

9. A computer implemented method of delivering media content to a client device, the method comprising:

identifying, by a content server, a user action transferring playback of media content from a first client device to a second client device, the first and second client device requiring different formats of the media content for playing back the media content;

determining, by the content server, whether the media content is locally available in the second format;

delivering the media content in the second format to the second device if the media content is locally available;

if the media content is not locally available in the second format:

identifying a first length of the media content that can be transmitted for playback to the second client device;

converting the first length of media content from the first format to the second format using a specific high-performance computing unit;

transmitting the converted first length of media content for immediate playback in the second client device;

splitting a remaining portion of the media content to a plurality of segments, the plurality of segments including a high-priority segment and a plurality of low-priority segments, wherein a segment-length of the high-priority segment is selected as a function of performance indicators associated with the plurality of lower-performance computing entities and wherein at the time of splitting the remaining portion of the media content into a plurality of segments, dynamically adjusting a duration of the first length of the media content based on performance indicators associated with the plurality of lower-performance indicators;

distributing the plurality of segments to a plurality of lower-performance computing units for conversion to the second format; and assembling the converted plurality of segments from the plurality of lower-performance computing units and delivering the assembled plurality of segments to the second client device such that the converted plurality of segments are available for playback on the second client device subsequent to playback of the first length of the media content.

10. A computer implemented method as recited in claim 9, wherein the user action is a physical gesture of the user in relation to the first client device or the second client device.

11. A computer implemented method as recited in claim 10, further comprising:

detecting the physical gesture of the user using API calls made to sentio codec implemented in the first and/or second client devices, the sentio codec comprising a plurality of codes suitable for encoding and decoding multi-dimensional experience data streams related to a multi-dimensional experience.

12. A computer implemented method as recited in claim 9, wherein the high-performance computing entity and each of the plurality of lower-performance computing entities are realized as one or more computing blocks in a cloud computing environment.

13. A content server comprising:

a network adapter through which to communicate with a plurality of client devices via a network;

a memory device coupled to the network adapter and configured to store code corresponding to a series of operations for delivering media content to a client device from the plurality of client devices, the series of operations including:

receiving, by a content server, a request from the client device for media content to be delivered to the client device at a specific format that is compatible with the client device;

if the media content is locally available in the specified format, delivering, by the content server, the locally available media content to the client device; and if the media content is not locally available in the specified format:

splitting the media content into a plurality of segments, the plurality of segments including a high-priority segment and a plurality of low-priority segments, wherein a segment-length of the high-priority segment is selected as a function of performance indicators associated with the plurality of lower-performance computing entities and wherein at the time of splitting the media content into a plurality of segments, dynamically adjusting segment-length of the high-priority segment based on the performance indicators;

transmitting the high-priority segment to a selected high-performance computing entity for prioritized conversion of the high-priority segment to the specific format;

transmitting the converted high-priority segment to the client device for playback of the media content pertaining to the high-priority segment;

transmitting each of the plurality of low-priority segments to one of a plurality of lower-performance computing entities for conversion of each of the low-priority segments to the specified format; and serially transmitting the converted low-priority segments to the client device for to be played back subsequent to the playback of the high-priority segment.

14. A content server as recited in claim 13, wherein said receiving a request from the client device further includes:
identifying a specific user action transferring playback of the media content from a transferee device to said client device, the transferee device configured to playback the media content using a first format and said client device configured to playback the media content using the specific format.

15. A content server as recited in claim 14, wherein the specific user action is a physical gesture of the user in relation to the transferee device or the client device.

16. A content server as recited in claim 14, wherein, at the time of receiving the request from the client device, the content server includes a local copy of the media content in the first format.

17. A content server as recited in claim 13, wherein the high-performance computing entity and each of the plurality of lower-performance computing entities are realized as one or more computing blocks in a cloud computing environment.

18. A content server as recited in claim 13, wherein, prior to transmitting the converted high-priority segment and the converted low-priority segments to the client device, the series of operations further includes:
receiving converted versions of the high-priority segment and/or the low-priority segments at an assembler; and
coordinating, by the assembler, delivery of the converted versions of the segments in a linear time order to the client device.

19. A content server as recited in claim 13, wherein each of the high-performance and lower-performance computing entities are dedicated solely for said conversion, further wherein processing cycles associated with the computing entities are maintained free for accepting requests for said conversion.

20. A system comprising:
a content server coupled to a plurality of clients over a communications network;
a first client device of the plurality of clients configured to playback media content using a first format;
a second client device of the plurality of clients configured to playback media content using a second format;
wherein, the content server is further configured to:
identify a user action transferring playback of media content from a first client device to a second client device;
determine whether the media content is locally available in the second format;
deliver the media content in the second format to the second device if the media content is locally available;
if the media content is not locally available in the second format:
identify a first length of the media content that can be transmitted for playback to the second client device;
convert the first length of media content from the first format to the second format using a specific high-performance computing unit;
transmit the converted first length of media content for immediate playback in the second client device;
prior to and during playback of the first length of the media device, split a remaining portion of the media content to a plurality of segments, the plurality of segments including a high-priority segment and a plurality of low-priority segments, wherein a segment-length of the high-priority segment is selected as a function of performance indicators associated with the plurality of lower-performance computing entities and wherein at the time of splitting the remaining portion of the media content into a plurality of segments, dynamically adjusting a duration of the first length of the media content based on performance indicators associated with the plurality of lower-performance indicators;
distribute the plurality of segments to a plurality of lower-performance computing units for conversion to the second format; and
assemble the converted plurality of segments from the plurality of lower-performance computing units and delivering the assembled plurality of segments to the second client device such that the converted plurality of segments are available for playback on the second client device subsequent to playback of the first length of the media content.

21. A system as recited in claim 20, wherein the user action is a physical gesture of the user in relation to the first client device or the second client device.

22. A system as recited in claim 21, wherein the content server is further configured to:
detect the physical gesture of the user using API calls made to sentio codec implemented in the first and/or second client devices, the sentio codec comprising a plurality of codes suitable for encoding and decoding multi-dimensional experience data streams related to a multi-dimensional experience.

23. A system as recited in claim 20, wherein the high-performance computing entity and each of the plurality of lower-performance computing entities are realized as one or more computing blocks in a cloud computing environment.

* * * * *